(12) United States Patent
Hani et al.

(10) Patent No.: US 7,796,083 B2
(45) Date of Patent: Sep. 14, 2010

(54) METHOD AND APPARATUS FOR CALIBRATING A GLOBAL POSITIONING SYSTEM OSCILLATOR

(75) Inventors: Mohammad Bani Hani, Lindenhurst, IL (US); Bruce Bernhardt, Wauconda, IL (US)

(73) Assignee: Motorola-Mobility, Inc., Libertyville, IL (US)

( * ) Notice: Subject to any disclaimer, the term of this patent is extended or adjusted under 35 U.S.C. 154(b) by 223 days.

(21) Appl. No.: 11/957,790

(22) Filed: Dec. 17, 2007

(65) Prior Publication Data

US 2009/0153398 A1 Jun. 18, 2009

(51) Int. Cl.
*G01S 19/23* (2010.01)
(52) U.S. Cl. ................................. 342/357.62
(58) Field of Classification Search ............ 342/357.02, 342/357.15, 357.12
See application file for complete search history.

(56) References Cited

U.S. PATENT DOCUMENTS

| 5,629,708 | A | 5/1997 | Rodal et al. |
| 5,654,718 | A | 8/1997 | Beason et al. |
| 6,320,536 | B1 * | 11/2001 | Sasaki ................... 342/357.15 |
| 6,472,943 | B1 * | 10/2002 | Soong et al. .................. 331/44 |
| 6,816,111 | B2 * | 11/2004 | Krasner ................. 342/357.12 |
| 6,965,754 | B2 * | 11/2005 | King ......................... 455/12.1 |
| 7,010,307 | B2 | 3/2006 | Abraham |
| 7,015,762 | B1 * | 3/2006 | Nicholls et al. ............... 331/10 |
| 7,110,442 | B2 | 9/2006 | Lennen |
| 7,548,130 | B2 * | 6/2009 | Kobayashi .................. 331/176 |
| 2008/0068258 | A1 * | 3/2008 | Maezawa et al. ....... 342/357.03 |

* cited by examiner

*Primary Examiner*—Thomas H Tarcza
*Assistant Examiner*—Cassi Galt
(74) *Attorney, Agent, or Firm*—Roland K. Bowler, II; Mathew C. Loppnow

(57) ABSTRACT

A method (200) and apparatus (100) for calibrating a global positioning system oscillator is disclosed. The apparatus may include a global positioning system receiver (120), a temperature compensated oscillator (130) coupled to the global positioning system receiver, a controller (140) coupled to the global positioning system receiver, and an offset module (150) coupled to the controller. The controller can control the operations of the apparatus. The offset module can send a calibration signal to the global positioning system receiver using values corresponding to an oscillator frequency rate of change vs. time.

18 Claims, 5 Drawing Sheets

METHOD AND APPARATUS FOR CALIBRATING A GLOBAL POSITIONING SYSTEM OSCILLATOR

BACKGROUND

1. Field

The present disclosure is directed to global positioning system receivers. More particularly, the present disclosure is directed to a method and apparatus for calibrating a global positioning system oscillator.

2. Introduction

Presently, temperature compensated crystal oscillators (TCXO's) are used to generate a signal with a precise frequency to provide a stable clock signal for global positioning system receivers. Although temperature compensated crystal oscillators are designed for good thermal stability, they still can be subject to frequency drift during initial startup conditions and other conditions that affect the thermal stability. Such conditions can be based on the proximity of the temperature compensated crystal oscillator to other components in the same device, based on the orientation of the temperature compensated crystal oscillator, and based on other variables that affect thermal stability.

Some temperature compensated oscillators may adjust over a long term, but thermal instability can affect global positioning system performance from the short term change. Short term performance can be critical to obtaining initial position fixes as fast as possible, which can be one of the key parameters for navigation systems. One method of overcoming this effect is to utilize large temperature compensated crystal oscillators that have greater thermal mass, which reduces the rate of oscillator change. Unfortunately, the greater thermal mass limits the ability to utilize global positioning systems in small portable device, which require components to be as small as possible.

Thus, there is a need for an improved method and apparatus for calibrating a global positioning system receiver oscillator.

SUMMARY

A method and apparatus for calibrating a global positioning system receiver oscillator is disclosed. The apparatus may include a global positioning system receiver, a temperature compensated oscillator coupled to the global positioning system receiver, a controller coupled to the global positioning system receiver, the controller configured to control the operations of the apparatus, and an offset module coupled to the controller. The offset module can send a calibration signal to the global positioning system receiver using values corresponding to an oscillator frequency rate of change vs. time.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
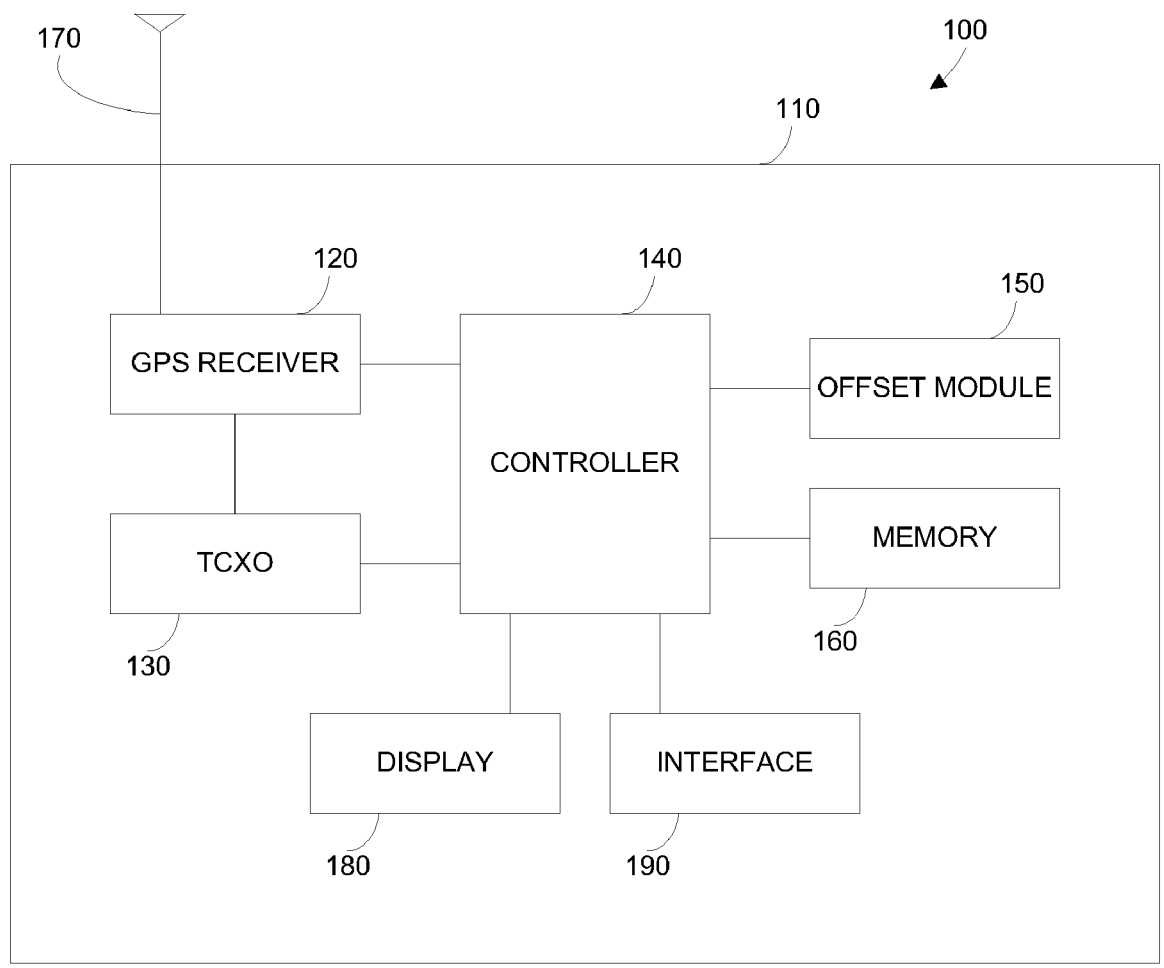
FIG. 1 illustrates an exemplary block diagram of an apparatus in accordance with a possible embodiment.

FIG. 1 illustrates an exemplary block diagram of an apparatus 100 in accordance with a possible embodiment. The apparatus 100 may be a global position apparatus, a wireless communication device, a wireless telephone, a cellular telephone, a personal digital assistant, a pager, a personal computer, a selective call receiver, or any other device that is capable of operating on a global positioning system. For example, such a global positioning system may be a Global Positioning System, a Global Navigation Satellite System, a Galileo system, a Glonas system, any other navigation system that relies on the resolution of time as part of a position solution, or a combination of the above systems. The apparatus 100 can include a housing 110, a global positioning system receiver 120, a temperature compensated oscillator 130 coupled to the global positioning system receiver 120, a controller 140 coupled to the global positioning system receiver 120, and an offset module 150 coupled to the controller 140. The temperature compensated oscillator 130 can be a temperature controlled crystal oscillator, a reference oscillator, a standard and accurate temperature compensated oscillator, or any other oscillator for a global positioning system that can be affected by temperature. The apparatus 100 can also include a memory 160 coupled to the controller 140 and an antenna 170 coupled to the global positioning system receiver 120. The offset module 150 can be coupled to the controller 140, can reside within the controller 140, can reside within the memory 160, can be an autonomous module, can be software, can be hardware, or can be in any other format useful for a module on an apparatus 100.

The apparatus 100 can also include a display 180 coupled to the controller 140 and an interface 190 coupled to the controller 140. The display 180 can be a liquid crystal display (LCD), a light emitting diode (LED) display, a plasma display, or any other means for displaying information. The interface 190 can include a keypad, buttons, a touch pad, a joystick, an additional display, a microphone, a speaker, a transducer, a data port, or any other device useful for providing an interface for an electronic device. The memory 160 may include a random access memory, a read only memory, an optical memory, a subscriber identity module memory, or any other memory that can be coupled to a controller.

In operation, the controller 140 can control the operations of the apparatus 100. The offset module 150 can send a calibration signal to the global positioning system receiver 120 using values corresponding to an oscillator frequency rate of change vs. time. The memory 160 can include a reference oscillator initial frequency offset table and the values can be based on data in the reference oscillator initial frequency offset table. Also, data in the reference oscillator initial frequency offset table can be calibrated to parameters that affect a frequency rate of change of the temperature compensated oscillator 130. Data in the reference oscillator initial frequency offset table can be further calibrated to a type of the temperature compensated oscillator 130, calibrated by taking into consideration a location of the temperature compensated oscillator 130 in the apparatus 100, and/or calibrated to a size of the temperature compensated oscillator 130. Data in the reference oscillator initial frequency offset table can be further calibrated by taking into consideration the thermal isolation of the temperature compensated oscillator 130 in the apparatus 100. Other parameters that can be taken into consideration by the data can include a position of the temperature compensated oscillator 130, thermal or electrical grounding of the temperature compensated oscillator 130, an orientation of the temperature compensated oscillator 130, layers in a printed circuit board the temperature compensated oscillator 130 is set on, material in the printed circuit board, or other parameters that affect a temperature compensated oscillator.

The values used by the offset module 150 can be based on polynomial coefficients that characterize a frequency rate of change against time of the temperature compensated oscillator 130. The values can also be based on a linear approximation of the change in a temperature compensated oscillator offset frequency. For example, the values can be based on a polynomial approximation of a temperature compensated oscillator offset frequency. The polynomial may be a first order polynomial or a higher order polynomial. The values can also be based on pre-measured frequency drift characteristics of the temperature compensated oscillator 130. For example, the values can be measured during development of the apparatus 100.

The offset module 150 can compensate for temperature compensated oscillator frequency drift during startup of the global positioning system receiver 120. The global positioning system receiver 120 can lock on to satellite and the offset module 150 can measure an actual frequency of the temperature compensated oscillator 130 against a desired frequency of the temperature compensated oscillator 130 and update corresponding values based on the difference between the actual frequency and the desired frequency. Thus, the apparatus 100 can employ self-learning in that it can update data and values if appropriate values change over time. For example, the apparatus 100 can change the values as the apparatus 100 ages and as relevant parameters change based on determining the desired frequency after locking onto the satellite carrier frequency.

The offset module 150 can also provide the global positioning system receiver 120 with an initial frequency offset value prior to satellite signal acquisition. The offset module 150 can additionally provide the global positioning system receiver 120 with frequency offset values after to satellite signal acquisition. Thus, the offset module 150 can be a self-learning offset module. The offset module 150 can further provide the global positioning system receiver 120 with updated initial frequency offset values over specific periods of time during satellite signal acquisition until the temperature compensated oscillator 130 settles to a final frequency.

The display 180 can display information for a user of the apparatus 100. For example, the display 180 can display a position determined by the global positioning system receiver 120. The display 180 can also display maps, directions, the date and time, menus or any other information useful for a user of the apparatus 100. The interface 190 can receive data from a user or another device. The interface 190 may also output signals corresponding to a position determined by the global positioning system receiver 120, where the signals can be in the form of tactile, audio, visual, or other signals to a user or in the form of digital signals to another device.

Therefore, for example, the apparatus 100 can compensate for initial temperature compensated oscillator 130 changes to improve overall performance. Besides including terms for the offset from an ideal target frequency of the temperature compensated oscillator 130, the apparatus 100 can also include a set of polynomial coefficients that can further characterize and refine the temperature compensated oscillator accuracy offset as a function of time and calibrate for this drift during boot up time or during periods where thermal drift would be expected. Accordingly, the time to first fix and overall sensitivity can be improved while still utilizing the smallest form factor temperature compensated oscillators, which can extend global navigation positioning systems into smaller handsets.

According to a related embodiment, the memory 160 and the controller 140 can provide the temperature compensated oscillator frequency offset model parameters to the global positioning system receiver 120 to adjust the oscillator frequency offset values during boot up times or other times when the global positioning system receiver integrated circuit temperature rises up. Table 1 below shows a sample of a memory table of temperature compensated oscillator frequency offset calibration data values and time index values. The time index value can be defined as the instant of time that follows the receiver power turn on time. For example, time t0 is the turn on time of the global positioning system receiver 120, time t1 is the time where offset value is $\Delta F1$, etc. At each time relative to global positioning system start up time, there can be an offset frequency value that can be used by GPS receiver to acquire satellite signals. The relevant value in the table may be the actual offset value, such as $\Delta F1$, or it may be a desired frequency at a selected time, such as F1, either of which may be used by the global positioning system receiver 120 to calibrate the signal from the temperature compensated oscillator 130.

TABLE 1

| Time Index | Frequency |
|---|---|
| t0 | F0 or $\Delta F0$ |
| t1 | F1 or $\Delta F1$ |
| t2 | F2 or $\Delta F2$ |
| ... | ... |
| ... | ... |
| tn | Fn or $\Delta Fn$ |

According to another related embodiment, the apparatus 100 can include a global positioning system receiver 120, a temperature compensated oscillator 130 coupled to the global positioning system receiver 120, a controller 140 coupled to the global positioning system receiver 120, a memory 150 coupled to the controller 140, an offset module 150 coupled to the controller 140, and an interface 190 coupled to the controller 140.

In operation, the controller 140 can control the operations of the apparatus 100. The memory 160 can include information corresponding to frequency drift characteristics of the temperature compensated oscillator 130 as a function of frequency and time. The offset module 150 can send a calibration signal to the global positioning system receiver 120 using values based on the information corresponding to frequency drift characteristics. The offset module 150 can also provide the global positioning system receiver 120 with the calibration signal prior to satellite signal acquisition. The interface 190 can output signals corresponding to a position determined by the global positioning system receiver 120.

Figure 2:
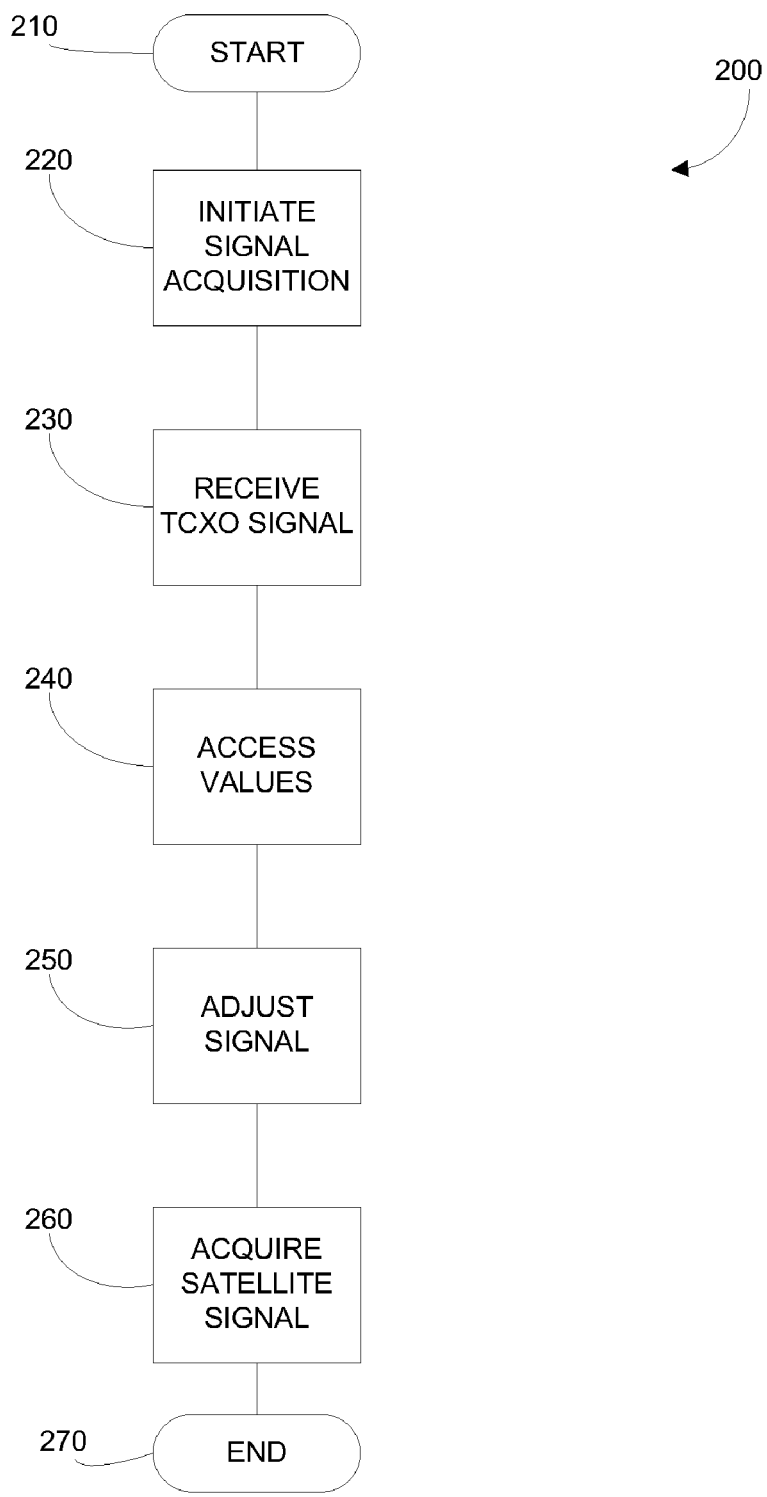
FIG. 2 is an exemplary flowchart illustrating the operation of an apparatus in accordance with a possible embodiment.

FIG. 2 is an exemplary flowchart 200 illustrating the operation of the global positioning receiver 120 according to another related embodiment. In step 210, the flowchart 200 begins. In step 220, the global positioning receiver 120 can initiate signal acquisition from a global positioning system satellite. In step 230, the global positioning receiver 120 can receive a signal from the temperature compensated oscillator 130. In step 240, the global positioning receiver 120 can access temporally changing compensation values for the temperature compensated oscillator 130. In step 250, the global positioning receiver 120 can adjust a signal from the temperature compensated oscillator 130 based on the temporally changing compensation values for the temperature compensated oscillator 130. The global positioning receiver 120 can also adjust the signal from the temperature compensated oscillator 130 by calibrating the signal from the temperature compensated oscillator 130 until the temperature compensated oscillator settles to a final frequency.

In step 260, the global positioning receiver 120 can acquire a signal from the global positioning system satellite based on the adjusted signals of the temperature compensated oscillator 130. Adjusting can be performed prior to satellite signal acquisition. In step 270, the flowchart 200 can end.

Figure 3:
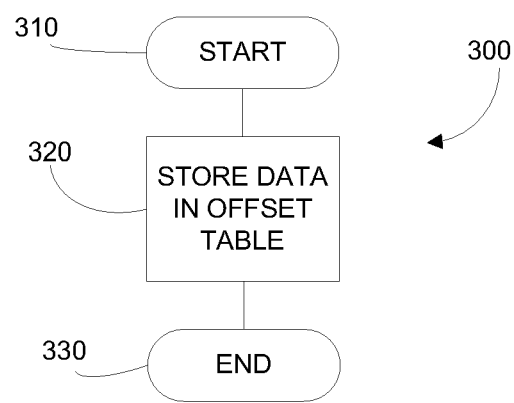
FIG. 3 is an exemplary flowchart illustrating the operation of an apparatus in accordance with another possible embodiment.

FIG. 3 is an exemplary flowchart 300 illustrating the operation of the global positioning receiver 120 according to another related embodiment. The flowchart 300 can be used in conjunction with the flowchart 200. In step 310, the flowchart 300 begins. In step 320, the global positioning receiver 120 can store data corresponding to the temporally changing compensation values in a reference oscillator initial frequency offset table. The data in the reference oscillator initial frequency offset table can be calibrated to parameters that affect a frequency rate of change corresponding to a temperature of the temperature compensated oscillator. For example, the temporally changing compensation values can be based on polynomial coefficients that characterize a frequency rate of change against time of the temperature compensated oscillator 130. The temporally changing compensation values can also be based on pre-measured frequency drift characteristics of the temperature compensated oscillator 130. In step 330, the flowchart 300 can end.

Figure 4:
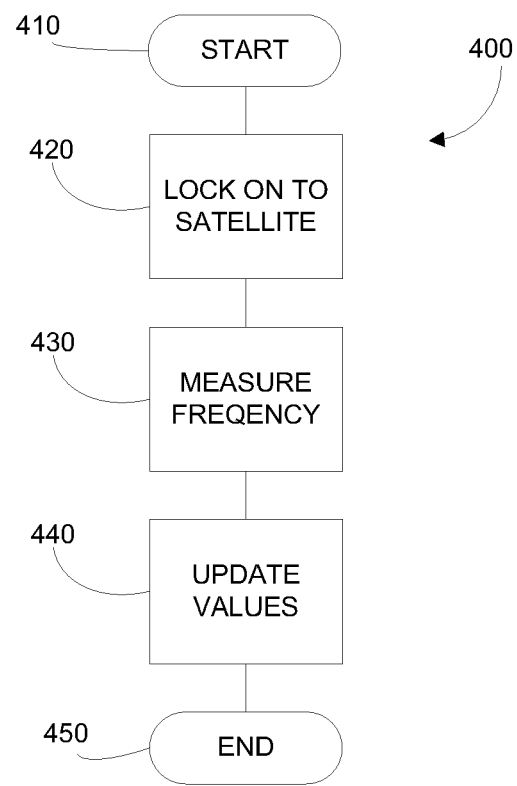
FIG. 4 is an exemplary flowchart illustrating the operation of an apparatus in accordance with another possible embodiment.

FIG. 4 is an exemplary flowchart 400 illustrating the operation of the global positioning receiver 120 according to another related embodiment. The flowchart 400 can be used in conjunction with the flowchart 200 and/or the flowchart 300. In step 410, the flowchart 400 begins. In step 420, the global positioning receiver 120 can lock on to a global positioning system satellite. In step 430, the global positioning receiver 120 or the controller 140 can measure an actual frequency of the temperature compensated oscillator 130 against a desired frequency of the temperature compensated oscillator. For example, the global positioning receiver 120 or the controller 140 can determine the desired frequency based on signals received from the global positioning satellite. In step 440, the global positioning receiver 120 or the controller 140 can update corresponding temporally changing compensation values based on the measurement. For example, the controller can update temporally changing compensation values in the memory 160, such as in a table in the memory 160 that references compensation values against time. In step 450, the flowchart 400 can end.

Thus, the present disclosure can provide a simple method and apparatus to compensate for global positioning system receiver reference oscillator frequency ramps. The compensation method of the oscillator frequency offset variations over time can minimize the impact on time to first fix and the number of timeouts when measuring global positioning system performance. For example, the apparatus 100 can provide such benefits in crucial global positioning system scenarios that can require compensation for the temperature compensated oscillator ramps upon powering up of the global positioning system chipset without requiring a large temperature compensated oscillator with high thermal mass and without the addition of a temperature sensor that requires extra cost of board area.

For example, many temperature compensated oscillators have specifications related to the minimum frequency ramp and ramp rate, such as about 10 ppb/second, at power up. While frequency ramps cannot be completely eliminated in these oscillators due to design limitations, the ramps can be compensated for through software correction techniques in the global positioning system receiver 120. The global positioning system reference oscillator frequency rate of change can be quantified vs. time to build a reference oscillator initial frequency offset table for power up times of the global positioning system receiver 120. Alternately or additionally, an oscillator frequency offset vs. time curve fit model can be established using a first, second, third, or higher order polynomial curve fit depending on the oscillator frequency drift response vs. time. The oscillator frequency offset model parameters can be used by the global positioning system receiver 120 to compensate for the oscillator frequency drifts over times when the global positioning system receiver chipset powers on and where its integrated circuit temperature starts to increase, which otherwise causes the oscillator frequency ramps to move far away from the temperature compensated oscillator specifications. The memory 160 can store the pre-measured global positioning system oscillator frequency offsets vs. time data and its associated ramp curve fit polynomial parameters as a another alternative. The controller 140 can then provide the global positioning system receiver 120 with the reference oscillator offsets vs. time curve fit model parameters that can be used for software corrections in the global positioning system receiver 120 for the reference oscillator offset over time.

Figure 5:
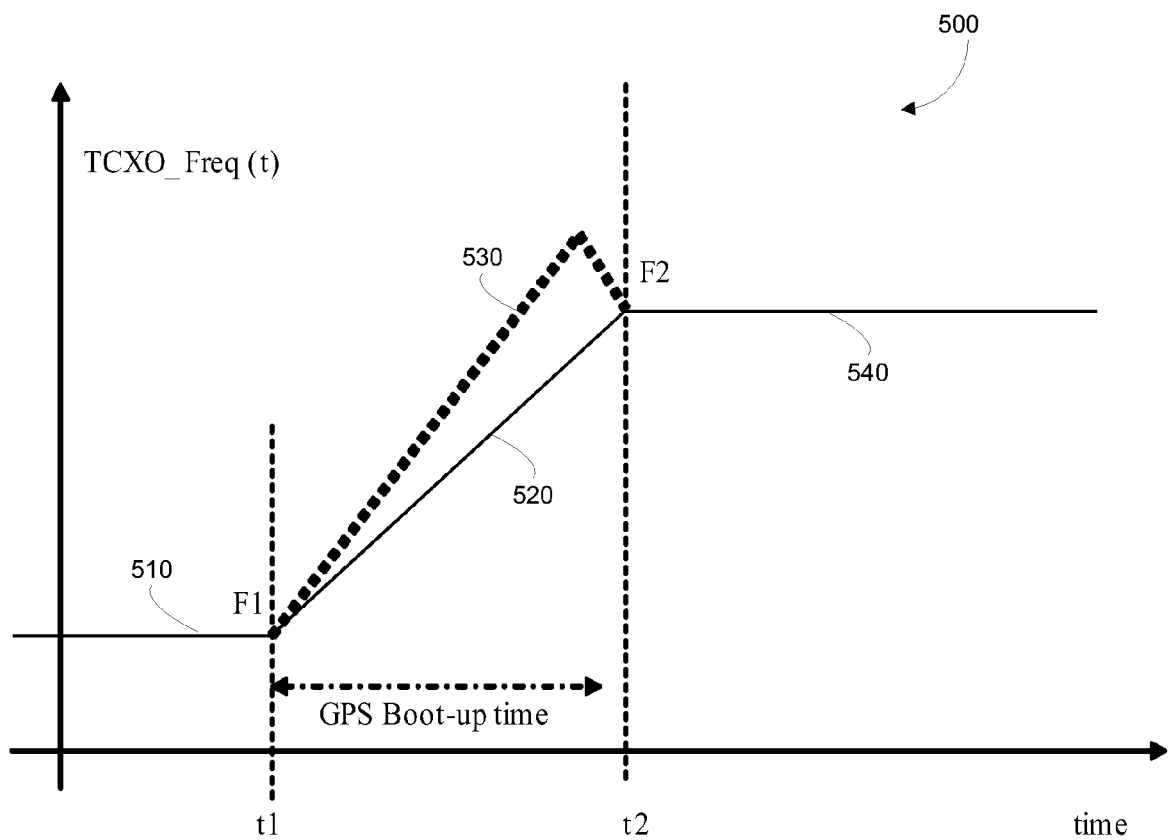
FIG. 5 is an exemplary graph showing temperature compensated oscillator frequency drift vs. time relative to global positioning system receiver boot up time.

FIG. 5 is an exemplary graph 500 showing temperature compensated oscillator frequency drift vs. time relative to global positioning system receiver 120 boot up time. In the graph 500, the temperature compensated oscillator initial frequency is denoted at 510 by F1 at time t1. The frequency can change over a period of time as denoted by 520. After a certain period of time, such as global positioning system receiver boot up time, the temperature compensated oscillator frequency can settle as denoted at 540 to F2 at time t2. The frequency of the temperature compensated oscillator 130 can be modeled simply by a linear first order curve fit such that the oscillator offset can be predictable over global positioning system receiver boot up times where the controller 140 can continue to provide the global positioning system receiver 120 with the oscillator frequency offset model parameters or update the global positioning system receiver 120 with a new oscillator frequency offset value that can be used through global positioning system software to correct for reference oscillator frequency errors over time. As noted by 530, there may be some frequency ramp overshoot, which can be neglected or can be modeled by a more complex or higher order equation. The temperature compensated oscillator frequency ramps during boot up time and the frequency offsets can be approximated by a polynomial equation. For example, the following equation can be used:

$$\text{TCXO\_Freq}(t) = \begin{matrix} F1 & \to t < t1 \\ a*t - b & \to t1 \le t \le t2, a = (F2 - F1)/(t2 - t1) \\ F2 & \to t > t2 \end{matrix}$$

The resulting compensation can be provided by the controller 140 to global positioning system receiver software such that global positioning system reference frequency error correction can be done in software using the parameters determined from the above equation.

Figure 6:
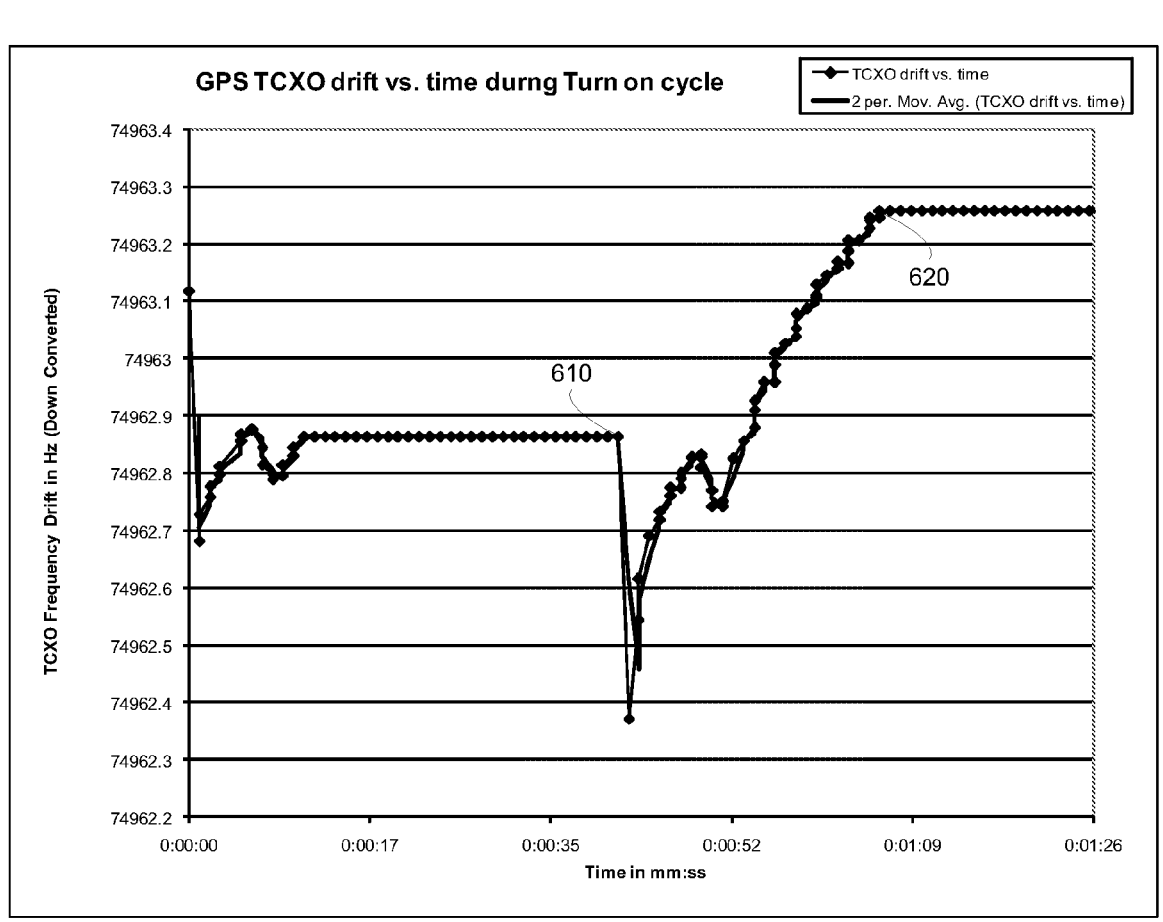
FIG. 6 is an exemplary graph showing a sample of a reference oscillator frequency drift data.

FIG. 6 is an exemplary graph 600 showing a sample of a reference oscillator frequency drift data that can represent the oscillator ramp during power up time of the global positioning system receiver 120. In this graph 600, the temperature compensated oscillator nominal frequency can change from a first frequency at a first time 610. As its temperature rises, such as after 2 to 3 seconds, the temperature compensated oscillator nominal frequency can settle in at a different frequency at a new time 620 as a function of the oscillator ramp response as shown in the figure. The oscillator frequency drift changes vs. time characterized in this figure can exhibit this behavior and the measured data can be filtered using moving average techniques.

Accordingly, the present disclosure can provide a method of compensating of temperature compensated oscillator frequency drift during global positioning system receiver boot up times. This can achieve quick acquisition of satellite signals with minimum time outs during boot up times and during cold starts. Temperature compensated oscillator pre-measured frequency drift characteristics can be stored in a table in a memory for the global positioning system receiver to use these known values of temperature compensated oscillator offset frequency in the receiver at certain boot up times. For each apparatus equipped with a particular global positioning system receiver circuit design and a particular temperature compensated oscillator, there can be a unique temperature compensated oscillator frequency offset ramp calibration table to be stored in the memory depending on the type of temperature compensated oscillator used, depending on how it has been laid out, depending on the global positioning system receiver technology, depending on printed circuit board thermal isolation in the apparatus, and/or depending on the global positioning system circuitry in general.

The apparatus 100 can monitor the rate of heating of the temperature compensated oscillator in the printed circuit board and can translate this in terms of temperature compensated oscillator frequency/temperature drifts vs. time and calibrate these drifts. This can allow the use of a smaller and lower profile temperature compensated oscillator component placed in an apparatus printed circuit board that may have greater thermal conductivity. The temperature compensated oscillator drift over time can be predictable and can be compensated for during global positioning system operation in power up times and under certain time periods where global positioning system performance becomes very sensitive to temperature compensated oscillator frequency temperature drift over short term time periods.

The present disclosure can also provide for allowing the global positioning system receiver to continuously compensate for the temperature compensated oscillator frequency drifts based on values stored in a look up table in the memory 160 or based on a linear approximation of the temperature compensated oscillator offset frequency where curve fit parameters can be stored the memory 160 without the use of temperature sensors. The controller 140 can provide compensation data to the global positioning system receiver 120 upon detection of time intervals that global positioning system receiver 120 operates at. For example, at the beginning of the global positioning system receiver satellite acquisition, the global positioning system receiver 120 can attempt to acquire enough satellite signals to calculate its position. At that instant of time and before satellite signal acquisition, the controller 140 can provide the global positioning system receiver 120 with an initial frequency offset value to start with. This offset value can be previously determined from measured temperature compensated oscillator characteristics at a respective time in lab. Once the global positioning system receiver 120 receives the first offset value, it can attempt to acquire the satellite signals and then calculate its position. At other time intervals during the global positioning system operation, the controller 140 can continue to provide updated values of the temperature compensated oscillator offset frequency to the global positioning system receiver 120 that can use the new value for acquisition. The controller 140 can continue to provide updated offset frequency values to the global positioning system receiver 120 until the temperature compensated oscillator 130 settles to its final frequency offset value, which can continue to be the only offset frequency value used at the global positioning system receiver 120.

This frequency drift compensation method can solve issues related to global positioning system acquisition during power up and can also solve for compensating for any frequency ramps that can occur due to thermal conductivity between the temperature compensated oscillator and the global positioning system receiver under certain conditions. For example, the temperature compensated oscillator 130 can be mounted in a handset at close proximity to the global positioning system receiver 120 chipset. Due to this proximity, the temperature compensated oscillator frequency offset during boot up times can be different from nominal. Also, if the temperature compensated oscillator 130 is mounted away from the global positioning system receiver 120, it can be exposed to thermal effects arising from the apparatus 100 itself, such as cellular modem power amplifier thermal and heating effects that can cause the temperature compensated oscillator 130 drift further from its nominal frequency value. The present disclosure can dynamically compensate for the temperature compensated oscillator frequency offsets due to board temperature rise regardless where the temperature compensated oscillator 130 has been laid out in the apparatus printed circuit board. This can result in a more compact design with smaller components. This can also allow for more variability of the layout.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
a global positioning system receiver;
a temperature compensated oscillator coupled to the global positioning system receiver;
a controller coupled to the global positioning system receiver, the controller configured to control operations of the apparatus;
a memory coupled to the controller, the memory configured to store pre-measured global positioning system oscillator frequency rate of change vs. time offset calibration data to calibrate a signal from the temperature compensated oscillator, where the pre-measured global positioning system oscillator frequency rate of change vs. time offset calibration data provides a boot up value at a first global positioning system receiver boot up time, update values for a time period between the global positioning system receiver boot up time and a settle time, where the update values correspond to temperature compensated oscillator frequency drift vs. time relative to the global positioning system receiver boot up time as the temperature compensated oscillator temperature rises from the global positioning system receiver boot up time to the settle time, and a settle value for a time after the settle time when the temperature compensated oscillator frequency substantially settles to a frequency; and
an offset module coupled to the controller, the offset module configured to send a temperature compensated oscillator offset signal to the global positioning system receiver using multiple values based on the pre-measured global positioning system oscillator frequency rate of change vs. time offset calibration data to calibrate a signal from the temperature controlled oscillator to compensate for a temperature controlled oscillator frequency ramp until the temperature compensated oscillator settles to a final frequency,
wherein the offset module provides the global positioning system receiver with initial frequency offset values based on the pre-measured global positioning system oscillator frequency rate of change vs. time offset calibration data to compensate for the temperature controlled oscillator frequency ramp prior to satellite signal acquisition.

2. The apparatus according to claim 1, wherein the memory includes a reference oscillator initial frequency offset table, wherein the pre-measured global positioning system oscillator frequency rate of change vs. time offset calibration data is stored in the reference oscillator initial frequency offset table.

3. The apparatus according to claim 1, wherein the memory includes a reference oscillator initial frequency offset table, wherein the pre-measured global positioning system oscillator frequency rate of change vs. time offset calibration data is stored in the reference oscillator initial frequency offset table and is calibrated to parameters that affect a frequency rate of change of the temperature compensated oscillator, and
wherein the values are based on data in the reference oscillator initial frequency offset table.

4. The apparatus according to claim 3, wherein the pre-measured global positioning system oscillator frequency rate of change vs. time offset calibration data in the reference oscillator initial frequency offset table is further one of calibrated to a type of the temperature compensated oscillator, calibrated by taking into consideration a location of the temperature compensated oscillator in the apparatus, and calibrated to a size of the temperature compensated oscillator.

5. The apparatus according to claim 3, wherein the pre-measured global positioning system oscillator frequency rate of change vs. time offset calibration data in the reference oscillator initial frequency offset table is further calibrated by taking into consideration thermal isolation of the temperature compensated oscillator in the apparatus.

6. The apparatus according to claim 1, wherein the the pre-measured global positioning system oscillator frequency rate of change vs. time offset calibration data include polynomial coefficients that characterize a frequency rate of change against time of the temperature compensated oscillator.

7. The apparatus according to claim 1, wherein the the pre-measured global positioning system oscillator frequency rate of change vs. time offset calibration data is based on a linear approximation of the change in a temperature compensated oscillator offset frequency.

8. The apparatus according to claim 1, wherein the offset module further compensates for temperature compensated oscillator frequency drift during startup of the global positioning system receiver.

9. The apparatus according to claim 1, wherein the the pre-measured global positioning system oscillator frequency rate of change vs. time offset calibration data is based on pre-measured frequency drift characteristics of the temperature compensated oscillator.

10. The apparatus according to claim 1,
wherein the global positioning system receiver is configured to lock on to satellite, and
wherein the offset module measures an actual frequency of the temperature compensated oscillator against a desired frequency of the temperature compensated oscillator and updates the pre-measured global positioning system oscillator frequency rate of change vs. time offset calibration data based on the difference between the actual frequency and the desired frequency.

11. The apparatus according to claim 1, wherein the offset module provides the global positioning system receiver with updated initial frequency offset values until the temperature compensated oscillator settles to a final frequency.

12. A method comprising:
storing pre-measured global positioning system oscillator frequency rate of change vs. time offset calibration data to calibrate a signal from a temperature compensated oscillator, where the pre-measured global positioning system oscillator frequency rate of change vs. time offset calibration data provides a boot up value at a first global positioning system receiver boot up time, update values for a time period between the global positioning system receiver boot up time and a settle time, where the update values correspond to temperature compensated oscillator frequency drift vs. time relative to the global positioning system receiver boot up time as the temperature compensated oscillator temperature rises from the global positioning system receiver boot up time to the settle time, and a settle value for a time after the settle time when the temperature compensated oscillator frequency substantially settles to a frequency;

initiating, in the global positioning system receiver, signal acquisition from a global positioning system satellite;

adjusting a signal from a temperature compensated oscillator based on multiple temporally changing compensation values for the temperature compensated oscillator using a temperature compensated oscillator offset signal, the values based on the pre-measured global positioning system oscillator frequency rate of change vs. time offset calibration data and, the values corresponding to an oscillator frequency rate of change vs. time to calibrate a signal from the temperature controlled oscillator to compensate for a temperature controlled oscillator frequency ramp until the temperature compensated oscillator settles to a final frequency; and acquiring a signal from the global positioning system satellite based on adjusted signals of the temperature compensated oscillator, wherein the signal is adjusted based on a plurality of the multiple temporally changing compensation values prior to satellite signal acquisition.

13. The method according to claim 12, further comprising storing the pre-measured global positioning system oscillator frequency rate of change vs. time offset calibration data corresponding to the temporally changing compensation values in a reference oscillator initial frequency offset table, wherein the data in the reference oscillator initial frequency offset table is calibrated to parameters that affect a frequency rate of change corresponding to a temperature of the temperature compensated oscillator.

14. The method according to claim 12, wherein the temporally changing compensation values are based on polynomial coefficients that characterize a frequency rate of change against time of the temperature compensated oscillator.

15. The method according to claim 12, wherein the temporally changing compensation values are based on pre-measured frequency drift characteristics of the temperature compensated oscillator.

16. The method according to claim 12, further comprising:
locking on to the global positioning system satellite;
measuring an actual frequency of the temperature compensated oscillator against a desired frequency of the temperature compensated oscillator; and
updating the pre-measured global positioning system oscillator frequency rate of change vs. time offset calibration data based on the measurement.

17. The method according to claim 12, wherein adjusting further comprises calibrating the signal from the temperature compensated oscillator until the temperature compensated oscillator settles to a final frequency.

18. An apparatus comprising:
a global positioning system receiver;
a temperature compensated oscillator coupled to the global positioning system receiver;
a controller coupled to the global positioning system receiver, the controller configured to control operations of the apparatus;
a memory coupled to the controller, the memory including information corresponding to frequency drift characteristics of the temperature compensated oscillator as a function of frequency and time, where the information includes pre-measured global positioning system oscillator frequency rate of change vs. time offset calibration data to calibrate a signal from the temperature compensated oscillator, where the pre-measured global positioning system oscillator frequency rate of change vs. time offset calibration data provides a boot up value at a first global positioning system receiver boot up time, update values for a time period between the global positioning system receiver boot up time and a settle time, where the update values correspond to temperature compensated oscillator frequency drift vs. time relative to the global positioning system receiver boot up time as the temperature compensated oscillator temperature rises from the global positioning system receiver boot up time to the settle time, and a settle value for a time after the settle time when the temperature compensated oscillator frequency substantially settles to a frequency;
an offset module coupled to the controller, the offset module configured to send a temperature compensated oscillator offset signal to the global positioning system receiver using multiple values based on the information corresponding to frequency drift characteristics corresponding to an oscillator frequency rate of change vs. time to calibrate a signal from the temperature controlled oscillator to compensate for a temperature controlled oscillator frequency ramp until the temperature compensated oscillator settles to a final frequency, where the offset module provides the global positioning system receiver with the temperature compensated oscillator offset signal prior to satellite signal acquisition; and
an interface coupled to the controller, where the interface is configured to output signals corresponding to a position determined by the global positioning system receiver.

* * * * *